Jan. 28, 1969   E. A. MAYER   3,424,182

VORTEX VALVE

Filed May 25, 1965

INVENTOR.
ENDRE A. MAYER
BY
ATTORNEY

United States Patent Office 3,424,182
Patented Jan. 28, 1969

3,424,182
VORTEX VALVE
Endre A. Mayer, Birmingham, Mich., assignor to The Bendix Corporation, Southfield, Mich., a corporation of Delaware
Filed May 25, 1965, Ser. No. 458,619
U.S. Cl. 137—81.5                         6 Claims
Int. Cl. F15c 1/16

ABSTRACT OF THE DISCLOSURE

A vortex device having an annular chamber with a supply fluid opening at one end, a cylindrical cavity including an outlet opening at the other end, and control ports between the ends to impart a rotational velocity to the supply fluid passing through the annular chamber such that vortical flow occurs in the cylindrical cavity and egresses through the outlet opening.

---

This application relates to a fluid device and more particularly to an improved fluid vortex valve.

Fluid vortex valves as generally known include a cylindrical chamber, an inlet for introducing supply fluid to the chamber, an axially disposed outlet for discharge of the fluid from the chamber and a control port for introducing control fluid tangentially into the chamber to impart rotational velocity or vorticity to the fluid flowing through the chamber. When the control flow is zero, the supply fluid introduced into the chamber leaves through the outlet without any restriction. However, the introduction of the control fluid imparts a rotational velocity to the fluid in the chamber which produces a reduction in the amount of fluid emerging from the outlet. The amount of fluid emerging decreases as the rotational velocity is increased.

In order to efficiently control the output of a vortex valve, it is essential to efficiently impart the rotational velocity from the control flow to the supply fluid within the cylindrical chamber or the vortex chamber. This invention relates to an improved vortex valve which accomplishes this with considerably greater efficiency than has been previously possible. In accordance with the invention, a member is disposed within the vortex chamber to provide an annular chamber between the member and the chamber housing. Control flow is introduced tangentially into the annular chamber in order to impart rotational velocity to the supply fluid as it flows through the annular chamber.

It is an object of this invention to provide an improved fluid vortex valve.

It is another object of this invention to provide an improved vortex valve wherin the rotational velocity is efficiently imparted by control flow to the supply flow.

It is a further object of this invention to provide an improved vortex valve of the above character which includes a member of button type configuration within the vortex chamber to provide an annular chamber and to impart rotational velocity to the supply fluid as it passes through the annular chamber.

Other objects and advantages will become apparent from the following detailed description and from the appended drawings and claims.

Figure 1:
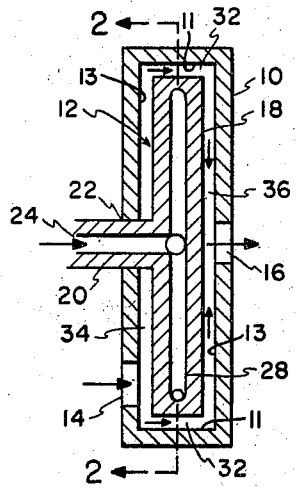
Figure 2:
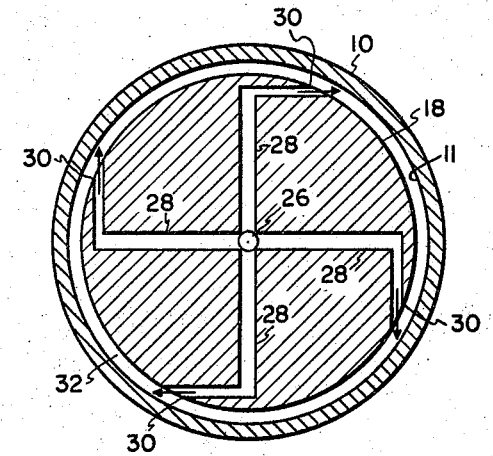
Figure 3:
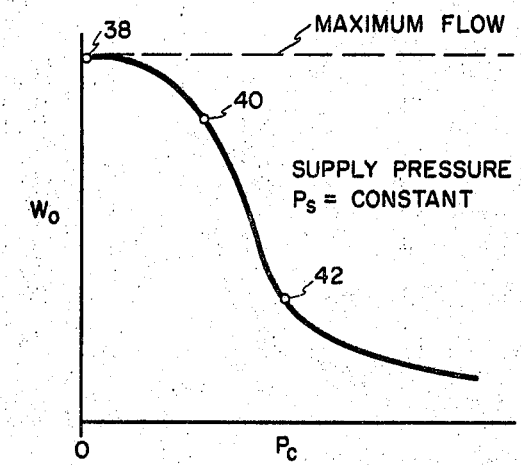

In the drawings:
FIGURE 1 is a schematic representation of a side sectional view of an embodiment of this invention.
FIGURE 2 is a front sectional view taken substantially along line 2—2 of FIGURE 1.
FIGURE 3 is a graph showing the fluid output of the device in FIGURE 1 under different conditions.

In FIGURE 1, a housing 10 defines a cylindrical chamber or cavity generally indicated at 12 having a side wall 11 and end walls 13. A supply inlet opening 14 extends through one end wall 13 in the housing 10 for the introduction of supply fluid, such as air, under pressure into the chamber 12. Also extending through the housing 10, axially of the chamber 12 and in the other end wall 13, is a supply outlet opening 16 for exhausting the supply fluid from the chamber 12 to the atmosphere.

Disposed within the chamber 12 is a cylindrical body member 18. A shaft 20 extends from the member 18 through an annular opening 22 through the housing 10 and supports the member 18 within the chamber 12. A fluid control inlet line 24 extends through the shaft 20 and communicates with a central annular opening 26 in the member 18. A plurality of chanels 28 extend from the opening 26 through the member 18. The outlets 30 of these channels communicate with the annular chamber 32 between the member 18 and the housing 10. Preferably, the outlets 30 are spaced at substantially equal intervals along the periphery of the member 18. Control fluid introduced under pressure to the line 24 passes through the opening 26, the channels 28 and is introduced into the chamber 32 from the outlets 30 in a direction having a substantial component directed tangentially of the chamber 32.

In the operation of the valve described above, supply fluid introduced through the opening 14 enters the plenum chamber 34 between the member 18 and the housing 10. From the plenum chamber 34, the fluid passes through the annular chamber 32, the vortex chamber 36 and then emerges from the outlet 16. At a constant supply pressure, the amount of fluid flow $W_0$ from the opening 16 is at a maximum when the control flow introduced to the line 24 is zero. With zero control flow, no rotational velocity is imparted to the supply fluid as it passes through the annular chamber 32 and as a result the fluid flows radially through the vortex chamber 36 to the opening 16. This maximum flow is shown at point 38 in the graph of FIGURE 3 where the pressure of the control fluid flow $P_c$ is zero.

When a control flow is introduced to the line 24, this flow emerges from the outlets 30 of the channels 28 and imparts a rotational velocity to the supply fluid as it passes through the annular chamber 32. Because of the relatively small volume of the chamber 32 and because of the plurality of outlets 30 that communicate therewith, the rotational velocity is imparted to the supply fluid very efficiently. The supply fluid then entering the vortex chamber 36 has added to it a rotational velocity component in addition to its radial velocity component. This rotational velocity increases as the fluid approaches the outlet 16 and results in a restriction in the flow from the outlet. The amount of restriction in the flow increases with the increase in the control flow. The graph in FIGURE 3 shows how the total flow $W_0$ from the outlet decreases as the control pressure $P_c$ increases.

In FIGURE 3, it will be noted that between the points 40 and 42, the fluid flow changes from a relatively high amount to a relatively low amount with a relatively small change in the control flow. This high gain characteristic is made possible by this invention which achieves maximum interaction between the control flow and the supply flow.

In the embodiment described above, the control flow has been introduced through the channels 28 provided in the member 18. It will be recognized that such tangential control flow into the annular chamber 32 may also be introduced through inlet ports provided in the outer housing 10. Further, any desired number of inlet ports in either or both the member 18 and the housing 10 may be provided for different applications. Also, the inlet ports may be disposed to introduce control flow in the same direction or one or more of them may be disposed to introduce control flow in a direction opposite to the flow from the other ports.

Although air has been the fluid used in describing this invention, persons skilled in the art will recognize that the device described will operate with other fluids, gaseous or liquid, such as nitrogen, water or oil. Also, persons skilled in the art will recognize that this invention is not limited to vortex valves but is applicable to other fluid vortex devices such as vortex amplifiers, vortex rate sensors and the like. The invention is, therefore, to be limited only as indicated by the scope of the appended claims.

I claim:
1. A fluid device comprising:
   a housing,
   a member disposed within the housing and defining a plenum chamber between one side of the member and the housing, a substantially annular chamber between the periphery of the member and the housing, and a vortex chamber between the other end of the member and the housing,
   the annular chamber being in communication with the plenum chamber and the vortex chamber being in communication with the annular chamber,
   an inlet opening in the housing for introducing supply fluid into the plenum chamber,
   an outlet opening in the housing for exhausting fluid from the vortex chamber,
   a plurality of channels extending through the member into communication with the annular chamber,
   the channels communicating with the annular chamber in a direction having a substantial component tangent to the annular chamber and at substantially equally spaced intervals,
   and means for producing a control fluid flow from the channels into the annular chamber to impart a rotational velocity to the supply fluid as it passes through the annular chamber for controlling the amount of fluid being exhausted from the outlet opening.

2. A fluid device as recited in claim 1 wherein the housing defines a cylindrical chamber and the member disposed therein is cylindrically shaped to define the annular chamber between the housing and the member.

3. A fluid device comprising means forming a substantially cylindrical cavity having side and end walls and a geometric axis extending through said end wall, substantially cylindrical body means in said cavity disposed in a spaced relation with said walls so as to form an annular chamber between said cavity side wall and said body, supply fluid inlet means communicating with said chamber, outlet means for said cavity in said end wall, and means communicating directly with said chamber for imparting a rotational flow about said axis to the supply fluid therein.

4. A fluid device according to claim 3 wherein said last mentioned means comprises control fluid outlet means arranged relative to said chamber so that fluid issuing therefrom is directed into said chamber in a direction having a substantial component directed tangentially of said chamber.

5. A fluid device according to claim 4 wherein said control fluid outlet means is located in said body means.

6. A fluid device according to claim 5 wherein said control fluid outlet means consists of a plurality of passages extending through said body means into communication with said chamber at substantially equally spaced locations in a direction extending about said axis.

References Cited
UNITED STATES PATENTS

| | | | |
|---|---|---|---|
| 3,039,490 | 6/1962 | Carlson | 137—81.5 |
| 3,075,227 | 1/1963 | Bowles | 137—81.5 |
| 3,198,214 | 8/1965 | Lorenz | 137—81.5 |
| 3,267,946 | 8/1966 | Adams | 137—81.5 |
| 3,272,213 | 9/1966 | Jones | 137—81.5 |
| 3,324,891 | 6/1967 | Rhoades | 137—81.5 |

M. CARY NELSON, *Primary Examiner.*
W. R. CLINE, *Assistant Examiner.*